United States Patent

[11] 3,552,537

[72] Inventor  Michael Vamvakas
              Rocky River, Ohio
[21] Appl. No. 746,371
[22] Filed     July 22, 1968
[45] Patented  Jan. 5, 1971
[73] Assignee  Barry-Wehmiller Company
              St. Louis, Mo.
              a corporation of Missouri

[54] CONTAINER FLOW CONTROL CONVEYOR SYSTEM
     10 Claims, 6 Drawing Figs.
[52] U.S. Cl. .................................................. 198/31
[51] Int. Cl. ............................................. B65g 47/26
[50] Field of Search .......................... 198/30, 31, 31(A1)

[56] References Cited
     UNITED STATES PATENTS
     2,813,617  11/1957  Sheetz .......................... 198/30

Primary Examiner—Edward A. Sroka
Attorney—Gravely, Lieder & Woodruff

ABSTRACT: A conveyor system in which a plurality of conveyors are operated at predetermined speeds to move a stream of containers through a transition zone where the containers are controlled against jamming by divider means to organize the flow stream into at least two streams for purposes of feeding separate processing apparatus or for other purposes.

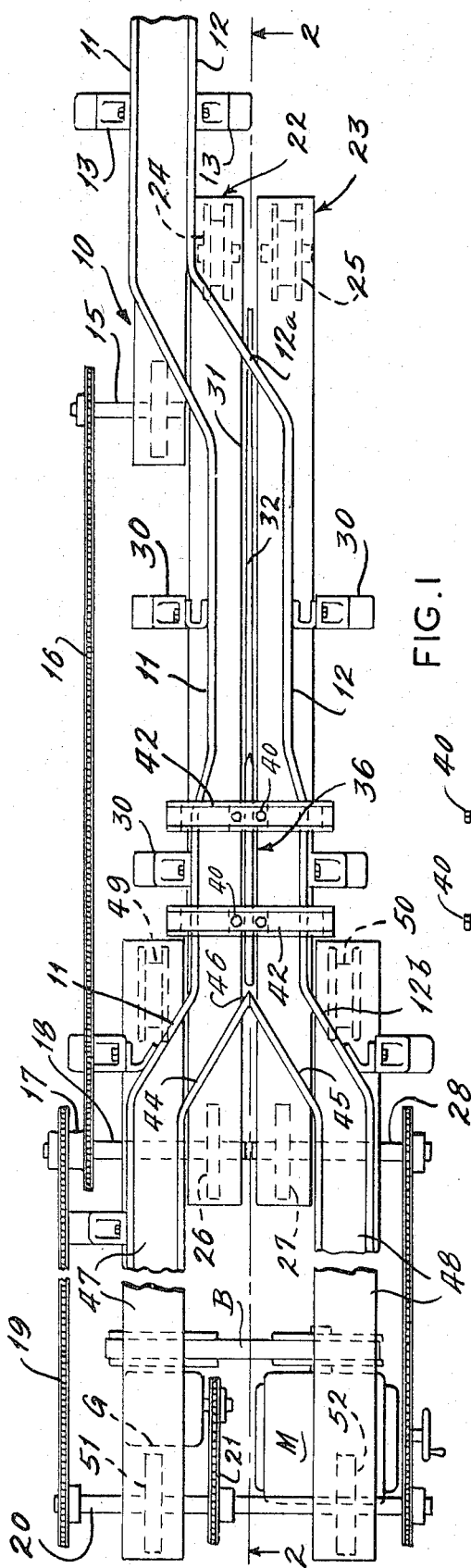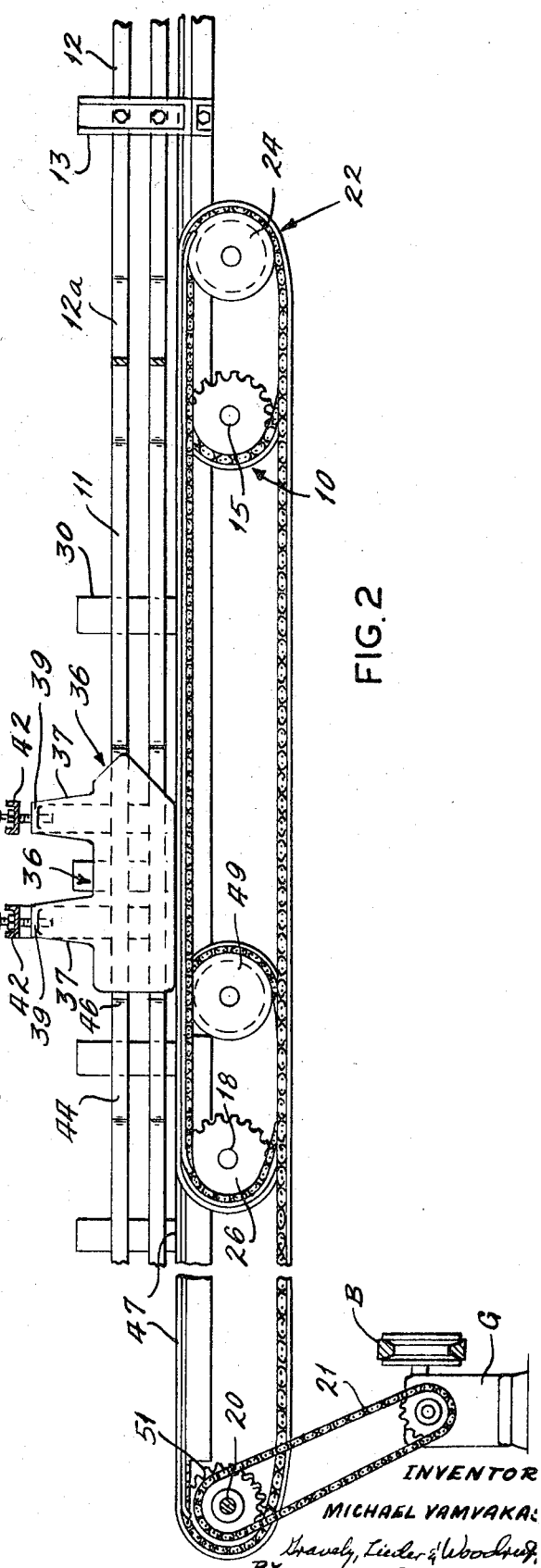
FIG.1
FIG.2

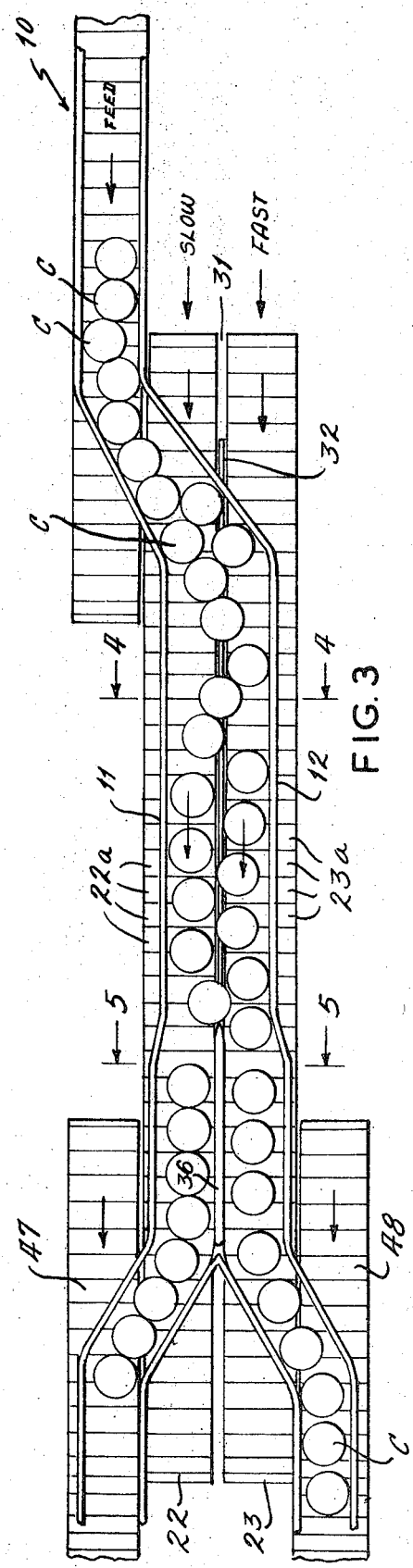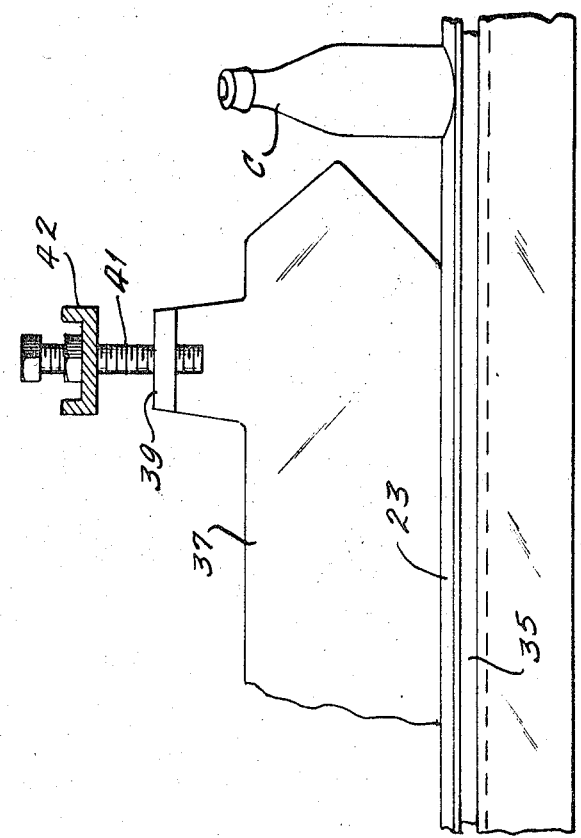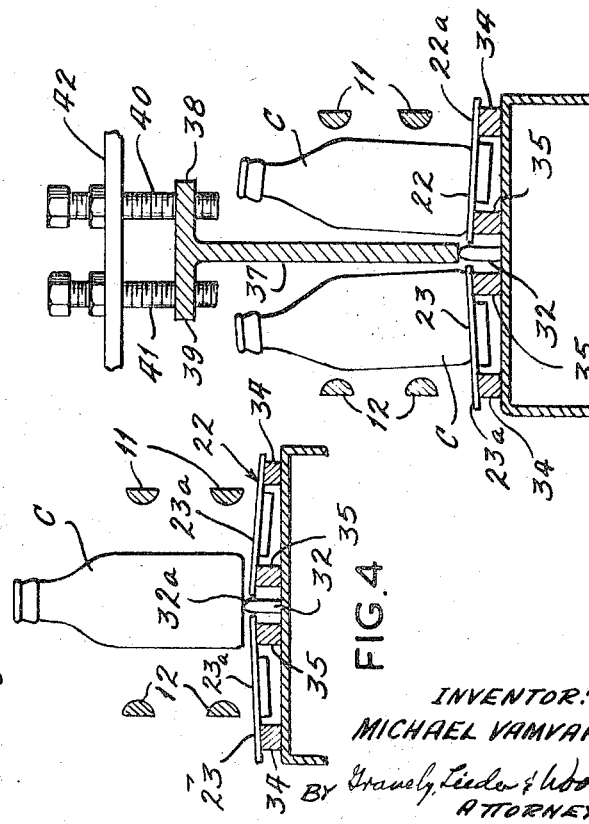

3,552,537

CONTAINER FLOW CONTROL CONVEYOR SYSTEM

This invention is concerned with improvements in conveying system for transporting containers from a random flow into separate organized flow streams with novel means to prevent jamming or clustering of the containers.

While the present apparatus is useful in connection with the handling of bottles, its application to the conveying of all types of containers is to be expected. The mass handling of containers presents certain problems in conveying the containers so as not to damage the containers. This is of special concern with conveying glass bottles due to the need to handle large quantities of bottles at substantial velocities in order to feed high capacity processing apparatus.

Bottling plants are generally set up to receive a large random mass of bottles and conveying means must be adapted to handle the random mass of bottles so that a smooth flow in an ordered arrangement may be achieved for purposes of feeding the various processing apparatus at substantially rated capacity. The flow in the conveyor systems must establish as nearly as practical a continuous or unbroken stream of bottles, and in this connection jams and clustering of bottles must be avoided.

An important object of the present invention is to provide simple and substantially foolproof means to automatically control the flow of containers from the random mass feeding into separate orderly streams.

It is also an important object of the present invention to provide conveyor means which will easily position the containers for smooth division into separate flow streams and to provide divider means that will establish the desired division.

Another object of the present invention is to provide a container-conveying system in which a differential speed of container movement is combined with automatic divider means to assure the avoidance of the foregoing mentioned and other problems.

A further object of this invention is to provide container flow control means for dividing a random flow of containers without interruption into separate flow paths so that a full complement of containers will be maintained in the separate paths.

Other and further objects of this invention will be pointed out in the following description of a preferred embodiment.

Such a preferred embodiment of a conveyor system includes a feed conveyor to receive a random flow of containers, a conveyor section in which adjacent conveyors are operated at different speeds to break up jams or clusters, means associated with the differential speed conveyor section to position the containers at divergent inclinations and automatically divide the flow into a plurality of streams, and other conveyor means to convey the divided streams to processing apparatus.

The preferred embodiment of this invention is illustrated in the drawings, wherein:

FIG. 1 is a plan view of the conveyor system which satisfies the various objects of the invention;

FIG. 2 is a longitudinal elevational view of the conveyor system as seen partly in section along line 2—2 in FIG. 1;

FIG. 3 is a longitudinal plan view showing a schematic layout of the conveyor apparatus of FIG. 1;

FIG. 4 is a transverse sectional elevation of the conveyor as seen at line 4—4 in FIG. 3;

FIG. 5 is a further transverse sectional view taken at line 5—5 in FIG. 3; and

FIG. 6 is a fragmentary side view of the container divider device seen in FIG. 2.

Referring now to FIGS. 1 and 2 in particular, there is shown so much of a conveyor system as is thought to be necessary to illustrate the present invention and support claims made therefor. In the assembly, containers such as bottles, are conveyed on an infeed conveyor 10 between guide rails 11 and 12 which are supported by suitable brackets 13 from the substructure (not shown). The infeed 10 is driven by a suitable sprocket 14 carried on a shaft 15 which is driven by a sprocket chain 16. The opposite end of the sprocket chain 16 from the shaft is connected to a double sprocket unit 17 carried on a shaft 18. The sprocket unit 17 is itself driven by a suitable sprocket chain 19 which is connected to a sprocket on shaft 20. The shaft 20 is driven out of a gearbox G and chain 21, and the gearbox G is connected by a belt B to a motor M, all as is well understood in the art.

The infeed conveyor 10 has its discharge end, as shown in FIG. 1, overlapped with the inlet ends of a slow speed conveyor 22 and an adjacent fast speed conveyor 23. The conveyor 22 is provided with a suitable idler sprocket wheel 24 and similarly the fast speed conveyor 23 is supported by an idler sprocket wheel 25. The conveyor 22 extends longitudinally and horizontally to a drive sprocket 26 on the shaft 18. The conveyor 23 likewise extends horizontally and substantially parallel with conveyor 22, to a drive sprocket 27 suitably mounted on a shaft 28 which is operated by a sprocket chain 29 connected to the previously described shaft 20. The sprocket chain 29 develops a speed for the drive sprocket 27 of the fast conveyor 23 which is greater than the speed developed through the sprocket chain 29 and sprocket unit 17 which drives the shaft on which the drive sprocket 26 is mounted. Thus, the conveyor 22 moves at a slower linear speed than does the conveyor 23.

As shown in FIGS. 1 and 2, the guide fences 11 and 12 have angular sections 11a and 12a which guide the flow of containers laterally away from the conveyor 10 and onto the conveyors 23 and 22. However, the continuation of the guide 11 and 12 is supported by brackets 30 in a zone of the conveyors 22 and 23 where the width between the guide fences is slightly more than twice the diameter of the largest container to be conveyed therethrough. In accomplishing this it can be observed from FIG. 3 that the line of flat top conveyor plates 22a are spaced from the line of similar conveyor plates 23a by a median gap 31. The gap 31 is just wide enough to receive a center rail 32 which begins at approximately the location of the fence section 12a (FIG. 3.) and continues through the gap space between the two conveyors to a point somewhat downstream from the beginning of the divider plow to be described hereinafter. As can be seen in FIG. 4 the flat top surfaces 22a and 23a of the slow and fast conveyor assemblies 22 and 23 are supported by a subtable structure 33 which carries outer spacer rails 34 and center spacer rails 35 which may be varied in vertical dimensions so that, during the reception of containers C from the infeed conveyor 10, the conveyors may be maintained substantially horizontal and in the same side-to-side plane throughout. As the containers progress in the direction of flow the center rail 32 may be increased in vertical dimension, as is shown in FIG. 4, and the rails 34 and 35 may be also adjusted in vertical dimension to result in the conveyor plates 22a and 23a of the respectively slow and fast conveyors being sloped outwardly away from each other so as to impart an outward inclination to the containers moved by the conveyor. Concurrently the rail 32 may be increased in vertical dimension so that its upper edge 32a projects above the level of the adjustable ends of the conveyor plates 22a and 23a. This projection of the center rail 32a upwardly in the median gap 31 provides means for causing the containers C to seek a position of travel either more fully on one or the other of the conveyors depending on whether the adjacent container will permit movement on one side or the other. In other words, the projecting portion 32a of the center rail causes the containers to take a definite position either on the slow conveyor or the fast conveyor.

As may be seen in FIGS. 1 and 2, the divider plow 36 is supported on its upwardly projecting arms 37 by the outwardly directed flanges 38 and 39. These flanges are respectively connected to vertical adjustment screws 40 and 41 which are in turn carried by a suitable support bar 42 which has opposite downwardly directed legs connected to the substructure such as that shown at 33 in FIGS. 4 and 5. The adjustment screws 40 and 41 may be differentially turned so as to locate the body of the plow 36 in vertical alignment with the center rail 32. This adjustment will permit the optimum location of the plow-point 43 on the body of the plow 36, both vertically and laterally in relation to the path of travel of the containers C. As can be seen in FIG. 6, the plowpoint 43 is vertically positioned at a level substantially equal to that of the shoulder of a container. The container shoulder is understood to be located at a point where the normally constant or relatively constant diameter begins to converge into the neck portion.

Downstream of the divider plow 36 the guide rails 11 and 12 flare outwardly at 11b and 12b. In cooperation with the flared guide rails an inner pair of guide rails 44 and 45 are connected at the junction 46 over the median gap 31 behind the plow body 36. Such rails flare outwardly to be substantially parallel with the guide rail portions 11b and 12b whereby to guide the containers laterally off of the ends of the slow and fast conveyors 22 and 23 respectively onto the respective ends of discharge conveyors 47 and 48. The latter conveyors have idler wheels 49 and 50 supporting the inlet end of these conveyors in overlapped parallel relation to the discharge end of the respective slow and fast conveyors 22 and 23. The opposite ends of the discharge conveyors 47 and 48 are operatively carried by drive sprockets 51 and 52, these sprockets being mounted on the shaft 20 so as to operate at substantially the same speed.

Looking again at FIG. 3, it can be understood that the flow of containers on conveyor 10 will be at a sufficient volume to crowd the containers across the slow moving conveyor 22 and onto the faster moving conveyor 23. This selection of slow and fast speeds for the respective conveyors 22 and 23 is set so that there will be substantially an equal division of the containers between the two conveyors and from crowding of the containers over the median gap 31 during the flow of containers in the direction of the arrows. In FIG. 3 the center rail 32 will begin to emerge and project above the level of the conveyor plates 22a and 23a, and concurrently these plates will begin to assume an outward divergent slope relative to each other. Any container which is crowded over the median gap 31 so as to be carried over the projecting portion 32a of the center rail 32 will be caused to teeter and thereby made to incline either to the right or left as seen in FIG. 5. There may on occasions be a sufficient crowding of containers so that a container riding the rail projection 32a can tilt to the right or left without actually moving off of the rail projection. In such a situation the container will be carried along with the stream of adjacent containers until the plowpoint 43 is reached. Assuming that a particular container is still riding on the center rail projection 32a, it can be appreciated, in looking at FIGS. 3 and 6, that the plowpoint 43 will be engaged by such a container always off center of a true diameter and this will enable the divider plow 36 to forcibly move such a container to the right or left depending on how it is engaged by the plowpoint 43.

It should now be understood from the foregoing description of a preferred embodiment of the present invention in what manner the conveyor apparatus is intended to operate for accepting a stream of containers onto at least two conveyors moving side by side at different linear velocities, with means to smoothly and effectively divide the container flow into two independent streams which may be taken away on suitable exit conveyor means for further handling. It should be understood, also, that changes and modifications may be made by those skilled in the art on understanding the principles of the present invention. Therefore, all changes and modifications are to be included within the spirit and scope of the appended claims.

I claim:

1. Apparatus for dividing a stream of containers into at least two separate streams comprising a pair of horizontally elongated conveyors having container-receiving and discharge ends and flat top surfaces on which containers engage in an upright position during conveyance, means supporting said conveyor flat top surfaces adjacent each other and in substantially the same planes for a portion of the conveyor travel adjacent said receiving end, other means spaced from said receiving end and operative for supporting said conveyors with said flat top surfaces pitched outwardly so as to be divergently slanted relative to the direction of movement, the divergent slant of said conveyors being substantially uniform throughout its length and causing the containers to tilt away from each other to open a space between and above the bottom ends of the upright containers, and container divider means disposed between said ends of the divergently pitched conveyor flat top surfaces in alignment with the open spaces between the containers and to be engaged by and force certain of the containers to move laterally relative to the travel of said conveyors and completely onto one of said pair of conveyors and others of the containers completely onto the other of said pair of conveyors.

2. The conveyor apparatus of claim 1 in which said pair of conveyors travel at different speeds to prevent container clustering.

3. The conveyor apparatus of claim 2 in which a container feed conveyor is positioned to feed containers onto the slower speed one of said pair of conveyors.

4. The conveyor apparatus of claim 1 in which rail means is longitudinally disposed between said pair of conveyors with a top edge surface projecting above said flat top surfaces, said top edge surface causing containers to teeter unstably thereon and seek substantially complete support limited to either one of said pair of conveyors.

5. The conveyor apparatus of claim 1 in which said pair of conveyors travel at different speeds and a container feed conveyor is positioned adjacent the slower speed conveyor of said pair of conveyors.

6. Conveyor apparatus operative to divide a stream of containers which are advanced in single file at a predetermined linear velocity, said apparatus including a first conveyor having a loading end receiving the containers so advanced, a second conveyor having a loading end operable along side said first conveyor, guide means adjacent said first and second conveyors to guide containers onto said conveyors and assist containers to traverse said first conveyor onto said second conveyor, means downstream of said conveyor loading ends tilting said conveyors divergently away from each other, other guide means adjacent said first and second conveyors separating the containers tilted one way from those tilted another way, and means operating said first and second conveyors at different linear velocities to suppress container clustering.

7. The conveyor apparatus of claim 6 in which said first and second conveyors have linear velocities different from the linear velocity of the stream of advancing containers, and said other guide means includes a plow device positioned between said first and second conveyors.

8. The conveyor apparatus of claim 7 in which said plow device has a container-engaging projecting portion above the said conveyors, and means is connected to said plow device to adjust the position thereof.

9. The conveyor apparatus of claim 6 in which said first and second conveyors are positioned side by side and have flat top surfaces movable horizontally, and rail means is positioned between said conveyors to extend above the flat top surfaces and cause the containers to move more onto one or the other of said first and second conveyors.

10. Container flow divider conveyor apparatus including a container conveyor feeding the containers in a random mass in a common direction, a pair of side-by-side conveyors having inlet ends adjacent said feeding conveyor and outlet ends remote therefrom, first guide means adjacent said feeding conveyor and pair of side-by-side conveyors operative to guide the containers from said feeding conveyor onto said side-by-side conveyors, motor means operatively connected to said side-by-side conveyors to drive said conveyors at different speeds, means between the inlet and outlet ends of said pair of conveyors effective to tilt the conveyors in outwardly divergent planes for tilting the containers, container divider means positioned between said pair of conveyors and formed with a leading edge engaging the tilted containers at a selected elevation above the container bottoms, other conveyor means adjacent the outlet ends of said pair of conveyors to receive the respective streams of divided containers, and second guide means adjacent said other conveyor means operative to guide the containers thereon.